(12) United States Patent
Fischer et al.

(10) Patent No.: US 6,543,837 B2
(45) Date of Patent: Apr. 8, 2003

(54) FASTENING DEVICE FOR A FOLDING-TOP COVERING

(75) Inventors: Johann Fischer, Regen (DE); Michael Rauscher, Deggendorf (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 2 days.

(21) Appl. No.: 09/783,573

(22) Filed: Feb. 13, 2001

(65) Prior Publication Data

US 2001/0013712 A1 Aug. 16, 2001

(30) Foreign Application Priority Data

Feb. 16, 2000 (DE) .......................................... 200 02 780

(51) Int. Cl.$^7$ ................................................. B60J 7/00
(52) U.S. Cl. .............................. 296/107.11; 296/107.08; 296/121
(58) Field of Search ........................ 296/107.08, 107.11, 296/121

(56) References Cited

U.S. PATENT DOCUMENTS

| 5,540,476 A | * | 7/1996 | Cowsert ................. 296/107.11 |
| 5,947,546 A | * | 9/1999 | Hilliard et al. ......... 296/107.11 |
| 6,338,522 B1 | * | 1/2002 | LeBlanc ................. 296/107.11 |

* cited by examiner

Primary Examiner—D. Glenn Dayoan
Assistant Examiner—Lori L Coletta
(74) Attorney, Agent, or Firm—Davidson, Davidson & Kappel, LLC

(57) ABSTRACT

A fastening device for a folding-top covering of a folding top of an open motor vehicle, having a plug-in profile. The plug-in profile is fastened to the folding-top covering of the folding top. The fastening device also has a folding-top frame part and a receiving channel which is formed on the folding-top frame part. It is possible for the plug-in profile to be plugged into the receiving channel on the folding-top frame part in such a manner that a permanent fixing of the folding-top covering relative to the folding-top frame part can be produced.

16 Claims, 4 Drawing Sheets

FASTENING DEVICE FOR A FOLDING-TOP COVERING

FIELD OF THE INVENTION

The present invention relates to a fastening device for a folding-top covering of a folding top of an open motor vehicle, comprising a plug-in profile, said plug-in profile being fastened to the folding-top covering of the folding top, a folding-top frame part and a receiving channel which is formed on the folding top frame part.

DESCRIPTION OF THE PRIOR ART

Known fastening devices are either complicated in terms of assembly or complicated in terms of design. A complicated assembly, which comprises, for example, the bonding of a folding-top covering, leads to high assembly costs. A complicated structure for the fastening device leads to high production costs for the fastening device.

SUMMARY OF THE INVENTION

The object of the invention is to provide a fastening device which permits a reduction in the assembly times.

Furthermore, the object of the invention is to obtain a saving on weight on the fastening device.

These and further objects are achieved by the invention.

A fastening device according to the invention for a folding-top covering of a folding top of an open motor vehicle comprises a plug-in profile, the plug-in profile being fastened to the folding-top covering of the folding top, a folding-top frame part and a receiving channel which is formed on the folding-top frame part, it being possible for the plug-in profile to be plugged into the receiving channel on the folding-top frame part in such a manner that a permanent fixing of the folding-top covering relative to the folding-top frame part can be produced.

The simple plug-in fastening of the folding-top covering and of an inside roof lining on folding-top frame parts enables the expenditure on assembly to be considerably reduced.

The above mentioned object, the features and advantages of the present invention can be better understood by considering the following, detailed description of the preferred embodiments of the present invention and by reference to the associated drawings.

The invention is explained in greater detail below with reference to the drawings.

DETAILED DESCRIPTION OF A PREFERRED EMBODIMENT

Figure 1:
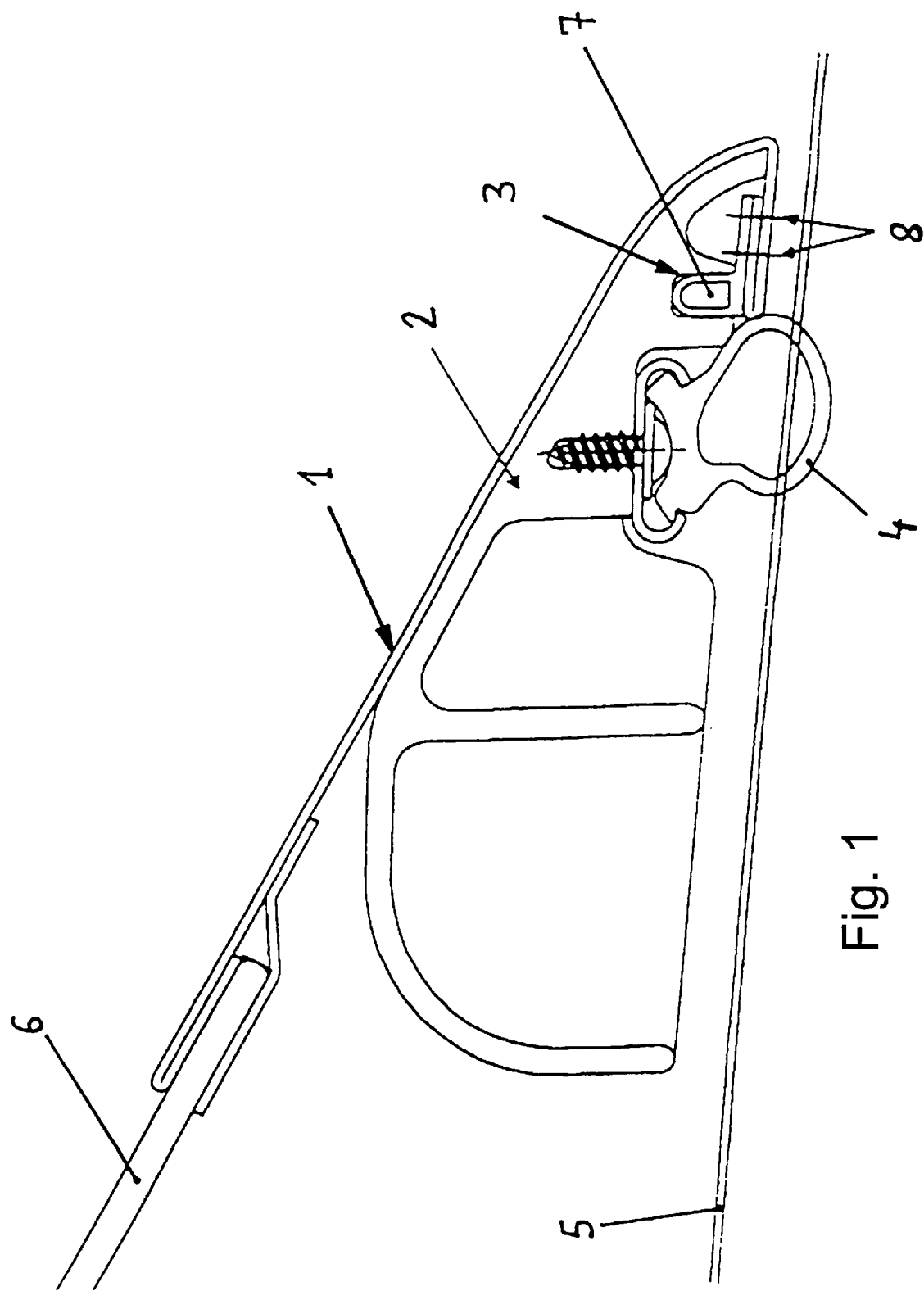
FIG. 1 shows a cross-sectional view of a fastening device according to the invention in accordance with a first preferred embodiment of the present invention, which device is realized on a clamping hook.

FIG. 1 shows the fastening device according to the invention in accordance with a first preferred embodiment, in a cross-sectional view. A folding-top covering 1 is fastened to a clamping hook 2 of a folding top for a convertible, for example, by means of the fastening device. The clamping hook 2 is part of the folding-top frame which is provided at the rear end (as seen in the direction of travel of the motor vehicle) of the folding top in order to clamp the folding top.

The reference number 6 denotes a rear window of the motor vehicle.

Situated below the clamping hook 2 is a folding-top compartment lid 5 against which a seal 4 comes to bear; FIG. 1 illustrates the initial state of the seal 4.

Provided on the clamping hook 2 is a receiving channel 3 which has an essentially rectangular cross section and which is provided for receiving a plug-in profile 7.

The plug-in profile 7 is of approximately P-shaped design in the cross-sectional view. One limb section serves here as a fastening section for the folding-top covering 1 which is guided around the right-hand end (see FIG. 1) of the clamping hook 2 and folded in the manner of a hem, i.e. doubled over and to which the leg section is sewn. In this embodiment, the sewing-on is realized by two seams 8.

Figure 3:
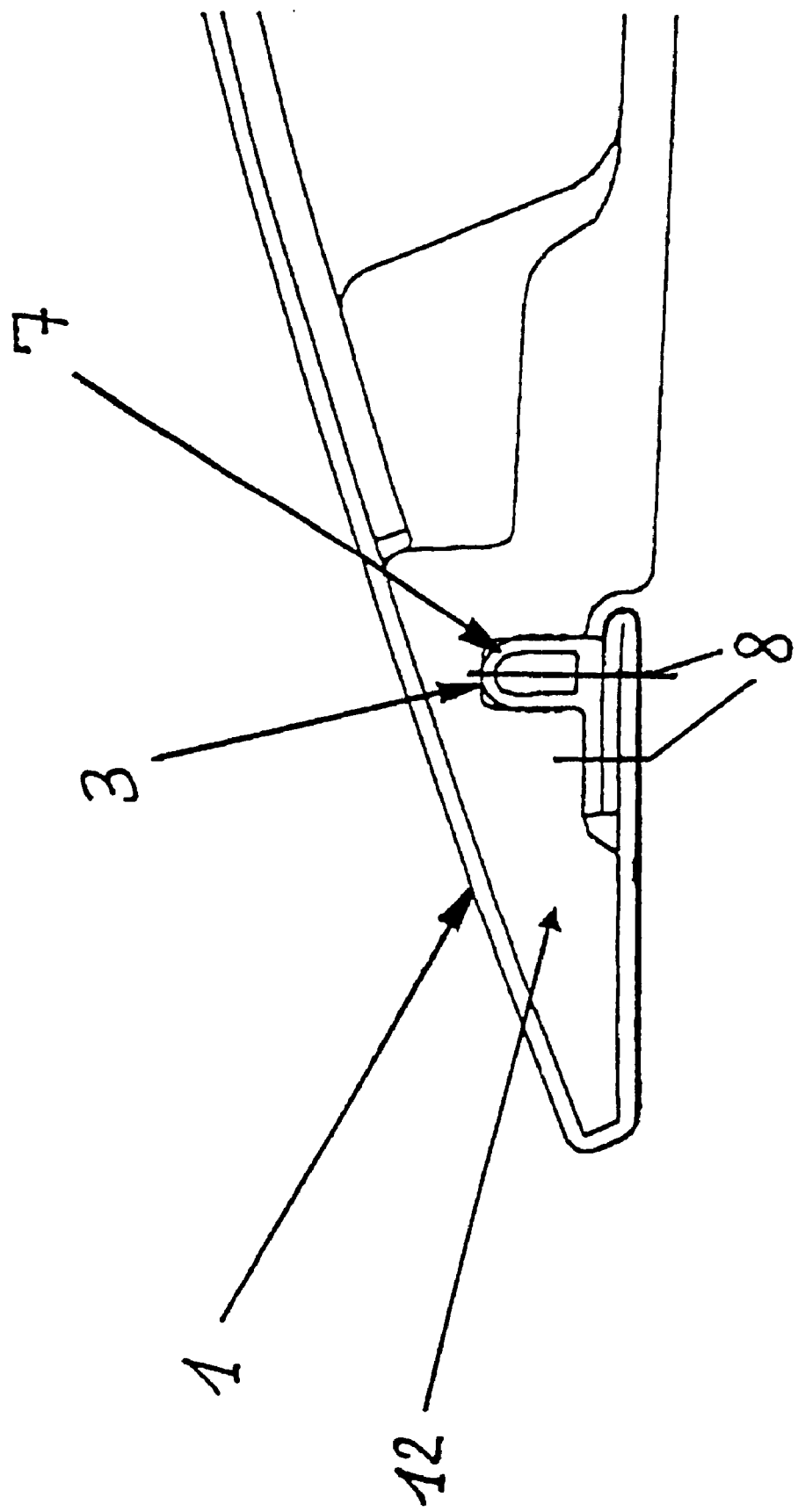
FIG. 3 shows a cross-sectional view of a fastening device according to the invention in accordance with a third preferred embodiment of the present invention, which device is realized on a front bow.

The sewing-on may also be realized through the plug-in profile 7, as is shown in FIG. 3.

The plug-in profile 7 may also differ in shape from the P-shape illustrated in the cross section. On the one hand, the ability to plug it into the receiving channel 3 must be ensured and, on the other hand, the fastening of the folding-top covering and of the inside roof lining must be ensured. The plug-in profile 7 has merely to satisfy these two requirements.

A plug-in section of the plug-in profile 7 is introduced into the receiving channel 3. The choice of material and the dimensions of the receiving channel 3 and plug-in profile 7 enable the plug-in profile 7 to be plugged into the receiving channel 3 in such a manner that a permanent connection between the clamping hook 2 and the folding-top covering 1 is produced.

The width of the plug-in profile 7 is preferably selected so that it is slightly larger than the width of the receiving channel 3 with the result that the plug-in profile 7 jams in the receiving channel after it has been introduced.

In a preferred embodiment, either the side wall of the receiving channel 3 or the side wall of the plug-in profile 7 can be provided with a surface structuring or profiling so as to increase the coefficient of friction between these components.

The plug-in profile 7 is advantageously manufactured from soft rubber. In particular, the plug-in profile 7 can be produced as an EPDM profile (ethylene propylene rubber) from an elastomer or from a foamed soft rubber and cellular rubber.

The plug-in fastening of the folding-top covering 1 to the clamping hook 2 enables the assembly time to be considerably reduced. Screw connections, bonded connections or similar types of fastening, which in particular would require extra tools, are not required. The fastening according to the invention takes place by simple plugging of the plug-in profile 7 into the receiving channel 3 of the clamping hook 2.

The fastening device according to the invention can be used on a clamping hook 2 of a folding-top frame and equally can also be used on other parts of the folding-top frame.

Figure 2:
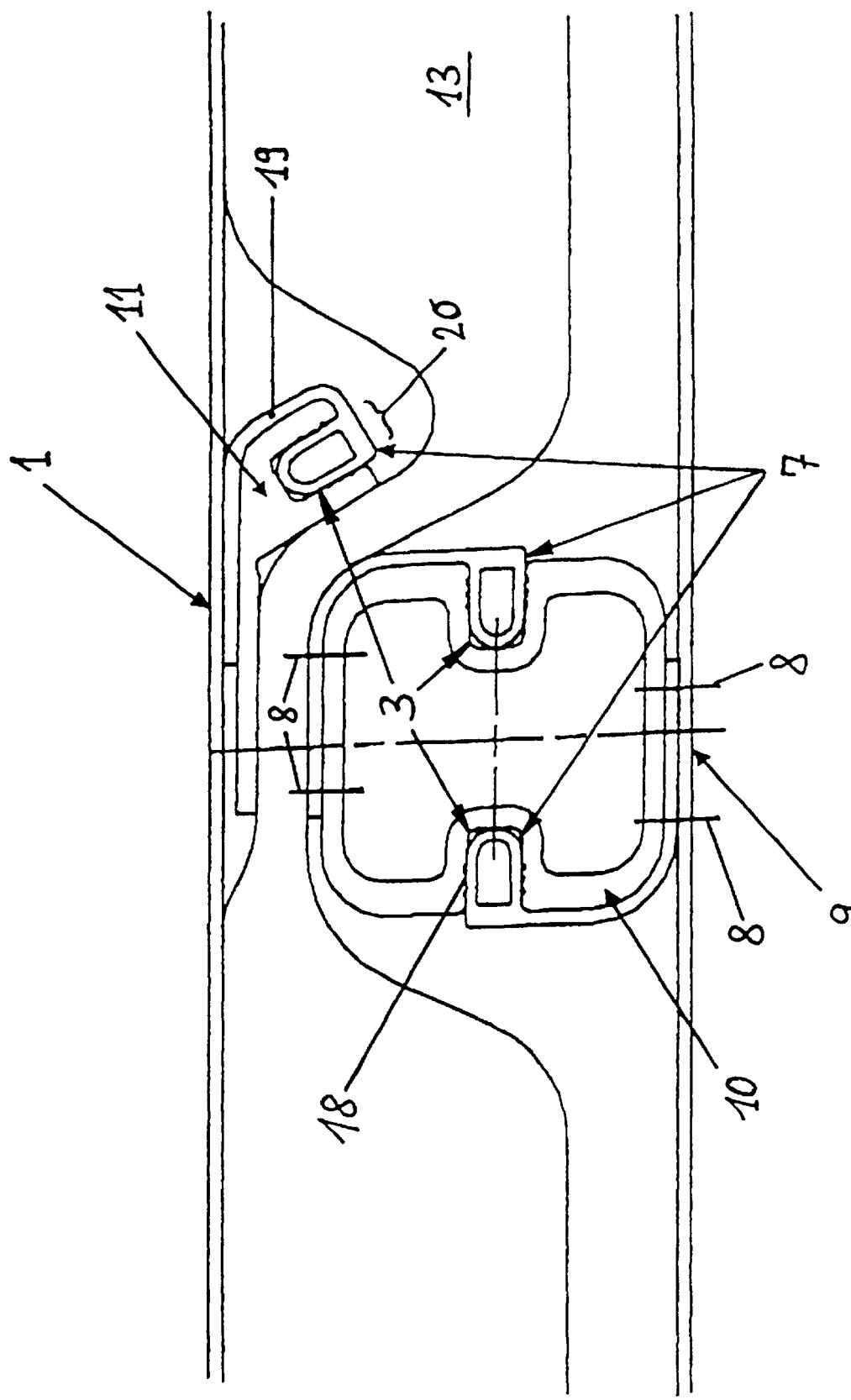
FIG. 2 shows a cross-sectional view of a fastening device according to the invention in accordance with a second preferred embodiment of the present invention, which device is realized on a bow tube.
Figure 4:
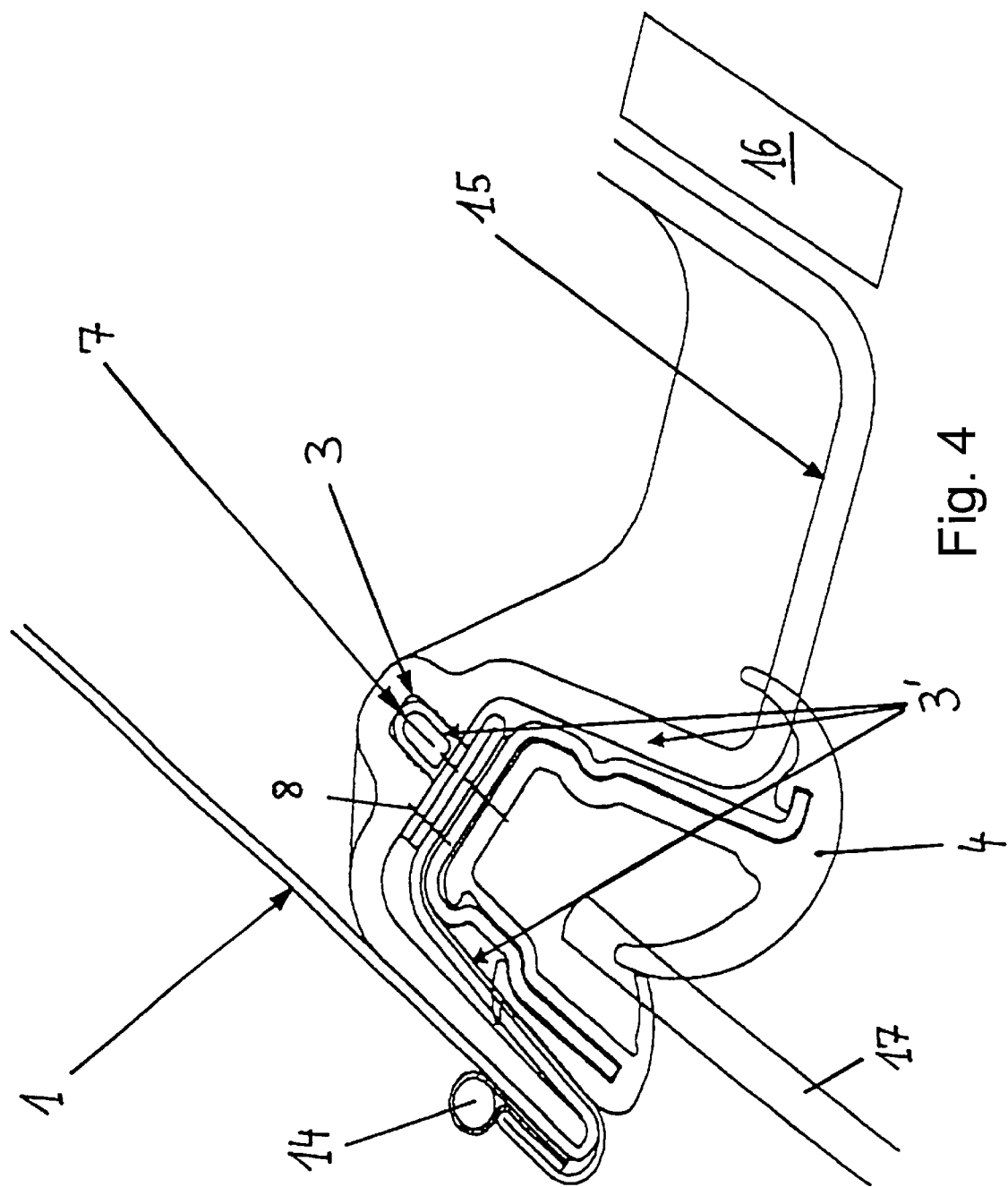
FIG. 4 shows a cross-sectional view of a fastening device according to the invention in accordance with a fourth preferred embodiment of the present invention, which device is realized on a holding bracket of a main pillar.

FIGS. 2 to 4 illustrate further embodiments of the fastening device according to the invention, the fastening of the folding-top covering 1 and/or the fastening of an inside roof lining 9 of the folding-top to a different folding-top frame part being shown in each case.

In FIG. 2, the fastening device is provided on a bow tube 10, the folding-top covering 1 being secured by the plug-in profile 7 to a weatherstrip profile 11 in the upper part of the drawing, while in the lower part of the drawing the inside roof lining 9, together with an insulating means 13, is fastened in each case to the bow tube 10.

In the example shown, the bow tube 10 is essentially of square design in cross section, a respective receiving channel 3 being provided on the two sides. The bow tube 10 is produced as an extruded profile and can therefore be manufactured cost-effectively.

The plug-in profiles 7 are plugged into these two receiving channels 3 on the bow tube 10, the insulation 13 being sewn to the right-hand plug-in profile 7 via two seams 8 (on the upper side of the bow tube 10) and being sewn to the left-hand plug-in profile 7 of the inside roof lining 9 via two further seams 8 (on the lower side of the bow tube 10).

As already mentioned above, the receiving channel 3 can have a profiling 18 which is indicated in FIG. 2.

The folding-top covering 1 is fastened to the limb section 19 of the plug-in profile 7, said plug-in profile 7 being plugged by its plug-in section 20 into a receiving channel 3 on the weatherstrip profile 11.

The fastening device according to the invention can be used on folding tops with or without insulation 13.

FIG. 3 shows the fastening device on a front bow 12 of a folding top. The receiving channel 3, into which the plug-in profile 7 is plugged, is formed on the front bow 12, the folding-top covering 1 being fastened to the limb section of the plug-in profile 7 with at least one seam 8.

Guiding the folding-top covering 1 around the left-hand end (in FIG. 3) of the front bow 12 enables the plug-in profile 7 to be largely freed from the stress on an opened folding top.

Finally, in FIG. 4, the fastening device according to the invention is provided on a holding bracket 15 of a main pillar 16 of the folding top.

The plug-in profile 7 is plugged into a receiving channel 3 on the holding bracket 15 and the folding-top covering 1 is fastened to said plug-in profile 7 by means of a seam 8. In the design shown, the folding top has a drip molding 14 which is illustrated in cross section in FIG. 4. Provided below the holding bracket 15 is a seal 4 which is arranged such that it lies next to a window 17.

In the embodiment shown, the receiving channel 3 is illustrated in the upper region of the holding bracket 15, but may also be provided in the lateral region, as is indicated at the reference numbers 3'.

The receiving channel 3 preferably does not have an undercut; if a type of hooking of the plug-in profile 7 into the receiving channel 3 should be required, an additional undercut could be provided.

The fastening device according to the invention firstly enables the expenditure on assembly to be reduced and secondly enables a saving on weight to be obtained, since additional fastening parts are no longer required.

As regards features of the invention which are not explained specifically and in greater detail above, reference is otherwise expressly made to the patent claims and the drawings.

What is claimed is:

1. A fastening device for a folding-top covering of a folding top of an open motor vehicle, comprising
    a plug-in profile, said plug-in profile being fastened to said folding-top covering of the folding top,
    a folding-top frame part, and
    a receiving channel which is formed on said folding-top frame part,
    said plug-in profile being pluggable into the receiving channel on said folding-top frame part in such manner that a permanent fixing of said folding top covering relative to said folding-top frame part can be produced,
    the plug-in profile being of P-shaped design in cross section, one limb section of the plug-in profile being provided for the fastening of the folding-top covering, while a plug-in section of the plug-in profile can be plugged into the receiving channel.

2. The fastening device as claimed in claim 1, wherein the plug-in section has a profiling on its side surfaces which come into contact with side walls of the receiving channel.

3. A fastening device for a folding-top covering of a folding top of an open motor vehicle, comprising
    a plug-in profile, said plug-in profile being fastened to said folding-top covering of the folding top,
    a folding-top frame part and
    a receiving channel which is formed on said folding-top frame part,
    said plug-in profile being pluggable into the receiving channel on said folding-top frame part in such manner that a permanent fixing of said folding top covering relative to said folding-top frame part can be produced,
    the width of the plug-in profile being slightly larger than the width of the receiving channel.

4. The fastening device as claimed in claim 3, wherein the folding-top covering is fastened to the plug-in profile in the form of a hem.

5. The fastening device as claimed in claim 3, wherein the folding-top frame part is at least one of a clamping hook, a bow tube, a holding bracket and a front bow.

6. The fastening device as claimed in claim 3, wherein the folding-top covering comprises an insulation.

7. The fastening device as claimed in claim 6, wherein the plug-in profile is arranged between the folding-top covering and the insulation.

8. The fastening device as claimed in claim 3, wherein the folding-top covering comprises an insulation.

9. The fastening device as claimed in claim 3, wherein the folding-top covering is sewn to the plug in profile.

10. The fastening device as claimed in claim 3, wherein the receiving channel has a profiling on the surface of its side walls which comes into contact with the plug-in profile.

11. The fastening device as recited in claim 3, wherein the plug-in profile is an elastomer profile essentially consisting of soft rubber and cellular rubber.

12. The fastening device as recited in claim 3 wherein the plug-in profile is of P-shaped design in cross section, one limb section of the plug-in profile being provided for the fastening of the folding-top covering, while a plug-in section of the plug-in profile can be plugged into the receiving channel.

13. The fastening device as recited in claim 3 wherein the folding top covering being sewn to the plug-in profile, the seam being doubled.

14. The fastening device as recited in claim 3 wherein the receiving channel does not have an undercut.

15. A fastening device for a folding-top covering of a folding top of an open motor vehicle, comprising
  a plug-in profile, said plug-in profile being fastened to said folding-top covering of the folding top,
  a folding-top frame part, and
  a receiving channel which is formed on said folding-top frame part,
  said plug-in profile being pluggable into the receiving channel on said folding-top frame part in such manner that a permanent fixing of said folding top covering relative to said folding-top frame part can be produced, the folding top covering being sewn to the plug-in profile so as to define a seam,
  the seam being doubled.

16. A fastening device for a folding-top covering of a folding top of an open motor vehicle, comprising
  a plug-in profile, said plug-in profile being fastened to said folding-top covering of the folding top,
  a folding-top frame part, and
  a receiving channel which is formed on said folding-top frame part,
  said plug-in profile being pluggable into the receiving channel on said folding-top frame part in such manner that a permanent fixing of said folding top covering relative to said folding-top frame part can be produced,
  wherein the receiving channel does not have an undercut.

* * * * *